Patented Sept. 16, 1947

2,427,577

UNITED STATES PATENT OFFICE 2,427,577

PRODUCTION OF ETHER SULPHONATES

Ralph Carlisle Smith, Jersey City, N. J., assignor to Colgate-Palmolive-Peet Company, Jersey City, N. J., a corporation of Delaware No Drawing. Continuation of application Serial No. 372,916, January 2, 1941. This application March 1, 1945, Serial No. 580,496

5 Claims. (Cl. 260—513)

This invention relates to the preparation of new chemical substances which are efficient wetting, washing and emulsifying agents. More particularly, this invention relates to the preparation of aliphatic ethers of polyhydroxy alkyl sulphonate compounds.

Many of the common detergents are unstable in contact with strong acids or alkali. Agents such as sodium lauryl sulphate, in the presence of hot, strong caustic soda, will be converted to the corresponding alcohol, lauryl alcohol, and an inorganic sulphate, sodium sulphate. On the other hand, fatty acid soaps in a strong acid solution will be split to a fatty acid and an inorganic salt. The fatty acid esters of isethionic acid are de-esterified in contact with either strong acid or strong alkali and hence are not completely satisfactory.

In addition, it has been noted that a simple aliphatic sulphonate does not have wholly satisfactory hydrophilic properties, but that the presence of one or more hydroxy and/or halogen groups in the molecule, relatively close to a sulphonate group, greatly improves the resistance of the compound to dusting when in a form having at least one short dimension.

It has now been discovered that new aliphatic hydroxy sulphonates can be prepared which are quite stable in both acid and alkaline solutions. It has further been discovered that if these compounds contain at least eight carbon atoms, they are excellent wetting, emulsifying and derging compounds which are operative in hard, soft or sea water whether hot or cold. They can be used for any purpose that other wetting, washing and emulsifying agents are used for, and they possess the added advantages of stability and high solubility.

The novel compounds of this invention are aliphatic ethers of hydroxy and/or halogenated aliphatic sulphonates. These compounds fall within the class of compounds having the formula (R—Z)$_m$—X—(SO$_3$)$_n$Y, wherein R is an aliphatic hydrocarbon radical; Z is oxygen or sulphur; X is a hydroxy and/or halogen substituted aliphatic radical; Y is a cation; and $m$ and $n$ are small whole numbers.

These compounds are readily and economically prepared by the novel process of the present invention. It has now been found that the reaction between an alcoholate, including thioalcoholates of an aliphatic alcohol, and a sulphonate of an aliphatic compound having at least one halogen and at least one additional halogen and/or hydroxy group substituted therein, or between an epoxy alkyl sulphonate and a long chain alcohol, including thioalcohols, produces an aliphatic ether of a halogen and/or hydroxy substituted alkyl sulphonate. The source of the aliphatic alcoholate is immaterial, and it may be prepared by the action of sodium, sodium amalgum, sodamide, or other metals, amalgums or amides, on alcohols, preferably in a solvent such as benzene, toluene, xylene or molten paraffin. It may also be prepared by the action of an alkali metal, an alkaline earth metal, magnesium, aluminum or zinc, or their amalgums, oxides, hydroxides or reactive salts, on the aliphatic alcohols at atmospheric or elevated temperatures and pressures, with or without non-reactive solvents. These aliphatic alcohols preferably contain at least six carbon atoms and saturated straight chains.

The halogen alkyl hydroxy sulphonates or polyhalogen alkyl sulphonates or epoxy alkyl sulphonates may be obtained from any source. They may be prepared according to the procedure of Darmstaedter in Liebig's Ann. Chem. 148, 126, (1868), or according to the process given in Ross U. S. Patent No. 2,195,581. The preferred reactants are 3 chlor, 2 hydroxy, propane sulphonic acid sodium salt, 2,3 dichlor propane sulphonic acid sodium salt, and 2,3 epoxy propane sulphonic acid and its salts. It is preferred that the final ether compound have the ether linkage at one end of the substituted alkyl sulphonate compound and have a halogen or hydroxy group substituted on a carbon adjacent to that having the sulphonate substitution, and further that these groups be at the other end of the molecular structure, since the products of such constitution possess the best emulsifying and hydrophilic properties. It is also preferred that the aliphatic constituents having the sulphonate and hydroxy and/or halogen substitutions have not more than six carbon atoms.

One way of preparing these compounds may be by dissolving a dry alcohol in a suitable solvent, such as toluene or xylene. To this solution is added an equivalent weight of an alkali metal or amide, such as sodium or sodamide, based on the mols of alcohol used. When sodamide is used, the solution is refluxed until ammonia vapor ceases to evolve, thus showing substantially complete conversion of the alcohol to an alcoholate. The temperature of reaction, of course, depends on the boiling point of the solvent being refluxed. A halogen alkyl hydroxy or halogen sulphonate salt is then added to the alkaline solution and the mixture is again refluxed with thorough agitation until the alkyl hydroxy or halogen sulphonate ether is formed. The solvent is removed by vacuum distillation.

Another method is to react a long chain alcohol with an epoxy alkyl sulphonate salt or with a dichloralkyl sulphonate and an aqueous caustic potash under such conditions that an epoxy compound is formed, e. g. at low temperatures.

The products may be rendered free from byproduct salts by treatment with ethyl alcohol, butyl alcohol, acetone, carbitol, monoglycerides, cellosolve, dioxane and/or the like. This may also be accomplished by preparing the calcium salt and filtering the product from the insoluble calcium sulphate. The cation of a salt product of the present invention may be interchanged with the cation of an inorganic salt by treating a solution of one or more salts of the organic product in one or more of the above named solvents with an excess of a concentrated aqueous solution of a salt of that cation which is to be exchanged for the original product salt cation. It should be noted that any of the products falling within the scope of the present invention may be neutralized and purified by the above outlined procedure.

The products of the present invention appear to owe much of their effectiveness to the presence of the free hydroxy group or groups and/or halogen group or groups in the residue of the aliphatic polyhydroxy substance. The solubility, and the foaming, wetting and washing efficiency, seem to be intimately associated with the structure of the compound. Furthermore, this grouping containing hydroxy radicals seems to reduce materially the tendency of the products to dust when formed into powders, beads, bubbles, flakes, ribbons, chips, or fibres. It is preferred to prepare the products from substituted short chain alkyl sulphonate salts, since these materials are more readily and economically prepared and produce more effective products than do the long chain alkyl sulphonates.

A consideration of the following example will give a better understanding of the invention, but the scope of the invention is not intended to be limited thereby.

*Example*

A solution of 18.6 parts of lauryl alcohol dissolved in 75 parts of toluene is refluxed with 4 parts of powdered sodamide until no further ammonia is evolved. Twenty parts of the sodium salt of gamma chlor, beta hydroxy propane sulphonic acid are added to the alkaline solution and the mixture refluxed for about twelve hours while vigorously stirring. The toluene is removed by vacuum distillation and the residue is taken up with water and extracted with butyl alcohol to remove the active ingredient from the sodium chloride. Upon evaporation of the butyl alcohol, a mono-lauryl ether of beta hydroxy propane sulphonic acid sodium salt is obtained.

Potassium cetylate may similarly be reacted with anhydrous dichlorpropane potassium sulphonate. In a somewhat similar manner a hexyl alcohol may be reacted with epoxy propane sodium sulphonate.

The aliphatic alcohols or alcoholates, including the corresponding thio-derivatives, may be straight or branched chain, saturated or unsaturated, and may be of primary, secondary or tertiary alcohols. Furthermore, they may be of mono- or poly-hydroxy or mercapto substances. The suitable substances include the following alcohols or alcoholates thereof: myristyl alcohol, carnaubyl alcohol, octadecyl alcohol, oleyl alcohol, myricyl alcohol, tertiary amyl alcohol, abietyl alcohol, polyglycol, benzyl alcohol, cyclohexanol, and mixtures thereof. Mixed alcoholates, such as those of alcohols produced by reduction of the coconut oil fatty acids, may be used.

The halogen alkyl sulphonates can be mono- or polyhydroxy and/or halogen substituted, which thus permits the preparation of poly-ethers. By the term "poly-" is meant two or more.

The free sulphonic acids can be prepared by treating the compound with a dilute mineral acid. The free sulphonic acids are useful for operating in an acid solution, such as in metal pickling.

The halogen and/or hydroxy sulphonate ethers are extremely stable in both alkaline and acid solutions. They are excellent detergents and emulsifiers and find use as domestic cleaning compositions, degreasing compounds, hard water detergents, etc. The presence of the halogen or hydroxy group materially increases the solubility and efficacy of the compound.

Although the new materials possess unusual deterging, sudsing and water-softening properties by themselves, they may be used with other emulsifying agents, including soaps, rosinates, long chain alcohol sulphates, alkylated aromatic sulphonic acid salts, sulphonated mineral oil extracts, Turkey red oil, lecithin, glycerolamines, monoethanolamine, diethanolamine and triethanolamine; coloring matter, such as dyes, lakes and pigments; abrasives and inert fillers, such as silica, pumice, feldspar, precipitated chalk, infusorial earth, bentonite, talc, starch and air; liquids, including carbon tetrachloride, perchloroethylene, trichloroethylene, glycerine, ethyl alcohol, tetrahydrofurfuryl alcohol, phenol, cyclohexanol, water, tetralin, hexalin, pine oil, mineral oil, mineral oil extracts and naphtha; perfumes and deodorants; fats, oils, fatty acids, monoglycerides, waxes, gums, or resins; germicides, such as phenol mercury chloride, phenyl mercury nitrate, phenyl mercury chloride, methyl salicylate and mercuric chloride; styptics; any of the common water-soluble salts, such as sodium carbonate, borate, phosphate (ortho-, pyro-, hexameta-), hypochlorite, thiosulphate, hydrosulphite, and hyposulphate, or the corresponding ammonium and potassium salts thereof. The type of addition agent to be used, of course, will depend on the ultimate use of the new composition.

The final detergent composition, with or without one or more addition agents, may be formed into beads, flakes, bars, chips, crystals, powders, solutions, liquid or plastic emulsions, pastes, creams, salves, or any other forms desired. The ingredients may be mixed by any of the common methods, such as grinding, stirring, kneading, crutching, fusing, etc., and the solutions may be dried with rolls, by spraying, or otherwise.

The compositions may be used in washing compositions for wood, metal, stone, glass, brick, masonry and painted surfaces; insecticides; cements; abrasive compositions; antiseptics; water softeners; deodorants and disinfectants; water paints and polishes; sizes, glues and adhesives, such as shellac and casein compositions; liquid, solid and paste tooth and mouth detergents; laundry detergents and other textile agents, including laundry blueing, bleaching, dyeing and discharging compositions; depilatories; dust preventing compositions; fire extinguishing compositions; drain, lavatory and radiator cleaners; anti-freezing, anti-fogging, and anti-corrosion compositions; wood impregnants; electrolytic baths; etching compositions; cosmetics, shaving preparations; shampoos and hair wave lotions; fat-liquors for leather; photographic solutions; plasticizers; paint, stain and grease removers; dry cleaning compositions; rug cleaners; petroleum de-emulsifying compositions; fruit washing; and any compositions requiring wetting, washing, emulsifying, penetrating, solubilizing, dispersing and like agents.

As many apparently widely different embodiments of this invention may be made without departing from the spirit and scope thereof, it is to be understood that the applicant does not limit himself to the specific proportions or embodiments thereof except as defined in the appended claims.

This application is a continuation of applicant's co-pending application Serial No. 372,916, filed January 2, 1941.

I claim:

1. The process which comprises reacting, in an alkaline condition, an epoxy alkyl sulphonate with an aliphatic alcohol compound of the group consisting of alcoholates and alcohols.

2. The process which comprises reacting, in an alkaline condition, an epoxy alkyl sulphonate having not more than six carbon atoms with an aliphatic alcoholic compound having at least six carbon atoms of the group consisting of alcoholates and alcohols.

3. The process which comprises reacting, in an alkaline condition, an epoxy alkyl sulphonate with a lauryl alcohol compound of the group consisting of alcoholates and alcohols.

4. The process which comprises reacting, in an alkaline condition, an epoxy alkyl sulphonate having not more than six carbon atoms with an aliphatic alcohol having at least six carbon atoms.

5. The process which comprises reacting, in an alkaline condition, a 2,3 epoxy propane sulphonate salt with a long-chain aliphatic alcoholate having at least six carbon atoms, to yield a long-chain ether of a hydroxy substituted propane sulphonate salt.

RALPH CARLISLE SMITH.

REFERENCES CITED

The following references are of record in the file of this patent:

FOREIGN PATENTS

| Number | Country | Date |
|---|---|---|
| 421,527 | Great Britain | Sept. 19, 1933 |
| 486,850 | Great Britain | June 7, 1938 |
| 204,118 | Switzerland | July 1, 1939 |
| 204,119 | Switzerland | July 1, 1939 |
| 702,732 | Germany | Feb. 14, 1941 |